United States Patent Office 3,792,002
Patented Feb. 12, 1974

3,792,002
HOT MELT PRESSURE SENSITIVE ADHESIVES
Bernhard Krieger, Bergkamen, Manfred Bolze, Bergkamen-Oberaden, and Manfred Drawert, Werne, Germany, assignors to Schering AG, Berlin, Germany
No Drawing. Filed Apr. 12, 1972, Ser. No. 243,423
Claims priority, application Germany, Apr. 17, 1971,
P 21 18 796.2
Int. Cl. C08k 1/66
U.S. Cl. 260—18 N           2 Claims

ABSTRACT OF THE DISCLOSURE

Hot melt pressure sensitive adhesives comprising (A) a polyamide resin, (B) a tackifier, and either or both of (C) a further polyamide or polyester amide which functions to retain tack in the adhesives or (D) an ethylene/vinyl acetate copolymer. Polyamide (A) comprises ethylene diamine, certain ether diamines, and a polymeric fatty acid. Preferred tackifiers (B) are the colophonium resins, Component (C) is formed between a polyamine or hydroxylamine and a polymeric fatty acid.

---

The present invention relates to hot melt pressure sensitive adhesives.

Hot melt contact adhesives or hot melt pressure-sensitive adhesives, like hot melt adhesives, in general, have well-known operating advantages when compared with adhesives applied in solution.

German patent publication 1,931,951 describes hot melt contact adhesives comprising an ethylene-vinyl acetate resin. However, these materials have the disadvantages of a tendency to creep under the influence of heat and of a premature loss of tack. These disadvantages of the present state of the art can be overcome by the hot melt contact or pressure sensitive adhesives of the present invention.

More in particular, the hot melt pressure sensitive adhesives of the invention comprise:

(A) A polyamide resin prepared by the condensation of a polymeric, largely dimeric, fatty acid, optionally together with a monomeric aliphatic, cycloaliphatic, aromatic, or aralipathic dicarboxylic acid having up to 20 carbon atoms, with ethylene diamine and an ether diamine of the formula

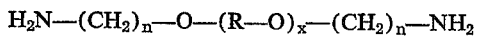

wherein $n$ is an integer from 2 to 5; $x$ has the value 0, 1, 2, or 3; and R is alkylene having from 1 to 12 carbon atoms which optionally may have 1 to 4 alkyl substituents thereon, each substituent having 1 to 4 carbon atoms;

(B) A conventional tackifier; and one or both of the following:

(C) A polyamide and/or polyesteramide containing free carboxyl groups and comprising polymerized fatty acids and polyamines or hydroxylamines, wherein the number of mols of polymerized fatty acid used per mol of polyamine or hydroxylamine is equal to the sum of the amino groups and hydroxy groups in the molecules of amine or hydroxylamine;

(D) An ethylene/vinyl acetate copolymer.

The hot melt pressure sensitive resin may also optionally contain:

(E) A silane adhesion promoter.

The polyamide resins (A) forming the base of the adhesive are known in the art, for example from U.S. Pat. 3,499,853. As described in detail in said patent, these polyamide resins are prepared by reacting substantially equivalent quantities of the diamine component and the acid component at condensation temperatures between about 180° C. and about 250° C. In the amine component, the equivalent ratio of ethylene diamine to ether diamine is between 0.9:0.1 and 0.3:0.7, and is preferably between about 0.7:0.3 and about 0.6:0.4. In the acid component, the optional monomeric dicarboxylic acid may be present in amounts of up to 20 percent by weight of the polymeric fatty acid present. The latter is prepared by the polymerization of monomeric saturated or ethylenically or acetylenically unsaturated natural or synthetic fatty acids having from 8 to 24 carbon atoms. The polymers may contain from about 55% to 100% by weight of dimeric fatty acid, suitably about 75%, together with minor amounts of monomeric and trimeric (or higher) fatty acids, e.g. 15% or trimer and 10% of monomer. The usual approximate composition of commercially available dimeric fatty acids prepared from $C_{18}$-fatty acid is:

| | Percent by weight |
|---|---|
| $C_{18}$-monocarboxylic acid | 5–15 |
| $C_{36}$-dicarboxylic acid | 60–80 |
| $C_{54}$- (and higher) tricarboxylic acids | 10–35 |

A pure dimeric fatty acid can be obtained by distillation. Polymeric fatty acids whose double bonds have been completely or partially hydrogenated can also be employed. In the reaction of the acid component with the amine component, amide-forming derivatives of the acids may be used, particularly their esters. Of the latter, those which are easily subjected to aminolysis, such as the methyl and ethyl esters, are preferred.

These polyamides can be modified by the addition thereto of small amounts of further suitable more flexible polyamides. Polyamides of the latter type are known from U.S. Pat. 3,377,303 and from British Pat. 1,107,524, for instance.

The polyamides described in the U.S. patent include a piperazine or dipiperidyl-type diamine component. The British patent discloses copolymers comprising a polymeric (95–100% dimeric) fatty acid, ethylene diamine, and epsilon-caprolactam.

Less flexible polyamides may also be employed therewith in small amounts.

Tack is produced by conventional tack-producing substances (B). Exemplary of such materials which can be used according to the present invention are: colophonium resins; tolene sulfonamides and N-substituted derivatives thereof such as N-cyclohexyl-p-toluene sulfonamide; esters of aromatic acids, such as p-hydroxy-benzoic acid-2-ethylhexyl ester and dioctyl phthalate; and other similar tack-producers such as the chlorinated diphenyls and polyphenyls. By "colophonium resins," as this term is employed in the present specification and claims, is meant those acid mixtures principally comprising abietic acid and its isomers which are derived from rosin or tall oil resins. The term also encompasses such acid mixtures which are modified by polymerization, hydrogenation, dehydrogenation, oxidation, decarboxylation, hydrolysis, esterification, or admixture with minor amounts of further resins. These colophonium resins are preferred tackifiers according to the present invention.

The tackifier amounts to 20–60 percent by weight of the base resin, preferably about 50 percent by weight. Adhesives comprising only these two components have properties which can be compared with those of prior art adhesives mentioned earlier herein.

The surprising discovery has now been found that loss of tack typical in such prior art compositions can be hindered if a polyamide or polyester amide having a high acid number, e.g. from 70 to 100, is combined with the adhesive mixture.

These "tack-retainers" can be obtained by the melt-condensation of hydroxylamines, preferably alkylolamines such as ethanolamine, propanolamine, diethanolamine, or dipropanolamine, or a polyamines, preferably alkylene diamines such as ethylene diamine, propylene diamine, or hexamethylene diamine, with polymerized fatty acids of the type earlier described herein. In these products, the number of mols of polymerized fatty acid is the same, per mol of amine, as the functionality of the amine.

The amount of tack-retainer employed can be varied within wide limits, for example from about 5 to about 50 percent by weight of the total adhesive mixture, but is preferably in a proportion of from 10-40 percent by weight.

It has further been found that the addition of an ethylene/vinyl acetate copolymer in which the ratio by weight of ethylene to vinyl acetate is between 90:10 and 60:40 surprisingly imparts an improved resistance to heat-creep, particularly when the addition is between about 5 and about 50 percent by weight of the base resin. In case an additive of this type is present, the tack-retaining material can optionally be present in an amount of from 10 to 30 percent by weight of the total mixture.

Still further components can be added to impart additional particular properties. Resistance to water can be improved by the addition of from about 1 to about 5 percent, by weight of the total mixture, of a silane adhesion improver, for example γ-glycidoxypropyl-trimethoxysilane. Adhesion under humid conditions is particularly improved.

The hot melt contact adhesive formulations according to the present invention are prepared in a protective atmosphere of an inert gas (e.g. nitrogen), with stirring, at temperatures between about 160° and 200° C. The components (for example a polyamide resin, a tackifier, and a tack-retainer) are melted at the mixing temperature and are usually mixed for two to three hours.

Ethylene-vinyl acetate copolymer is added portionwise to the melt.

Silane adhesion promoters are added after all of the resin components of the melt are molten.

In addition, fillers such as chalk or barite; and/or extenders such as cumarone-indene resins or ketone resins; auxiliary polyamide resins; and/or dyes can be added.

A better understanding of the present invention, and of its many advantages, will be had by referring to the following specific examples given by way of illustration. The examples are in part presented in tabular fashion. In the examples and tables, the key to the various abbreviations is as follows:

Polyamide base resin (A):
  $A_1$ polyamide resin, comprising dimeric fatty acid, adipic acid, ethylene diamine, and 1,12-diamino-4,9-dioxadodecane
  $A_2$ polyamide resin comprising dimerized fatty acid, ethylene diamine, and 1,12-diamino-4,9-dioxadodecane
  $A_3$ polyamide resin comprising dimerized fatty acid, terephthalic acid, ethylene diamine, and 1,12-diamino-4,9-dioxadodecane Tackifier (B):
  $B_1$ hydrogenated resin of mixed di- and tetra-hydroabietic acids
  $B_2$ p-hydroxy-benzoic acid-2-ethylheyxl ester
  $B_3$ pentaerythritol-abietic acid ester
  $B_4$ methyl ester of $B_1$ Tack-retainer (C):
  $C_1$ resin comprising dimerized fatty acid/ethylene diamine
  $C_2$ resin comprising dimerized fatty acid/diethanolamine Ethylene/vinyl acetate copolymer (D):
  $D_1$ ethylene/vinyl acetate copolymer (40:60 percent by weight)
  $D_2$ ethylene/vinyl acetate copolymer (67:33 percent by weight)

Silane adhesion promoter (E):
  E γ-glycidoxypropyl-trimethoxysilane

Supplemental resin (F):
  $F_1$ resin comprising 96 parts by weight of dimerized fatty acid, 4 parts by weight of adipic acid, and an equivalent amount of ethylene diamine
  $F_2$ resin comprising dimerized fatty acid and sebacic acid in an equivalent ratio of 0.67:0.33, and ethylene diamine and dipiperidyl-propane in an equivalent ratio of 0.5:0.5.

Properties:
  SP=Softening point according to DIN 1995
  Ad=Adhesion of the cold joint formed between an aluminum foil (width=3 cm.) and rubber
  HCR=Hot-creep resistance (test according to Example 12—expressed as length of the strip removed in centimeters)

EXAMPLE 1

100 grams of polyamide $A_1$ and 100 grams of tackifier $B_1$ were heated to 200° C. and mixed well together at this temperature for one hour. After that, the melt was poured onto silicon saturated paper for cooling.

EXAMPLES 2-6

(See following Tables II and III)

EXAMPLE 7

50 g. of polyamide basic resin $A_3$ and 40 g. of tackifier $B_1$ were melted together at 200° C. Under a protective nitrogen atmosphere, 10 g. of ethylene-vinyl acetate-copolymer $D_1$ were added in portions with stirring. The entire mixture was stirred for two hours at 200° C.

The hot-creep resistance of this adhesive was tested on an adhesive joint made with this formula between an aluminum foil and rubber. The width of the strip was three centimeters. The adhesive was put on in a layer thickness of 120 microns. The joint was prepared under a pressure of 1 kgf./cm.$^2$. The test body obtained in this manner was hung in a drying chamber at 60° C. and the aluminum strip was loaded with a weight of 61 g. at an angle of 180°. The maximum length of the test strip was 17 cm. After 20 minutes, 3 centimeters of the aluminum strip had torn off.

EXAMPLES 8-15

(See following Tables II and III)

EXAMPLE 16

In a planetary mixer, 40 g. of $A_3$, 30 g. of $C_1$, and 30 g. of $B_1$ were mixed at 190° C. for one hour, 100 g. of chalk were added to this melt and stirred for one additional hour at 150° C.

EXAMPLE 17

40 g. of $A_3$, 20 g. of $C_1$, 30 g. of $B_1$, and 10 g. of a further modified polyamide $F_2$ comprising dimerized fatty acid, sebacic acid, ethylene diamine, and dipiperidyl-propane were mixed together for two hours at 190° C. as in Example 1. The properties of the products were as follows:

SP=110° C.
Viscosity=40 poises at 120° C.
Good surface tack
Ad=3.5 kgf./3 cm.

EXAMPLE 18

40 g. of $A_2$, 55 g. of $B_1$, and 4 g. of $F_1$ were melted at 180° C. as in Example 1. 1 g. of silane adhesion promoter (E) was added to the melt and mixed for one hour at 180° C.

Polystyrene labels were adhered to glass with this adhesive. After 14 days storage under water, the bond was still excellent.

In the following tables, the preparation and properties of the products of all of the examples have been collated.

Preparation of Resin Types A and C

The components were heated together over a period of two hours to a temperature of 230° C., kept at this temperature for two additional hours, and then condensed for a further two hours at the same temperature under vacuum.

For the preparation of the resin $A_3$, the dimerized fatty acid was first pre-heated with dimethyl terephthalate to a temperature of 60° C. The remaining components were added thereto and the mixture was then treated further according to the general description.

The components and porperties of the individual resin types are collated in following Table I.

TABLE I

| Resin type | Amount (g.) | | | | |
|---|---|---|---|---|---|
| | $A_1$ | $A_2$ | $A_3$ | $C_1$ | $C_2$ |
| Components: | | | | | |
| Dimeric fatty acid (75% dimer fraction) | 516 | 200 | 280 | 5,000 | 400 |
| Ethylene diamine | 38.2 | 14.8 | 19.7 | 264 | |
| 1,12-diamino-4,9-dioxa-dodecane | 82.6 | 21.3 | 34.3 | | |
| Diethanolamine | | | | | 24.6 |
| Novolac resin | 12.4 | 5 | | | |
| Dimethyl terephthalate | | | 14 | | |
| Adipic acid | 20.6 | | | | |
| Properties: | | | | | |
| SP (° C.) | 130 | 93 | 192 | | |
| Viscosity (poises/° C.) | 30/200 | 10/160 | 218/200 | 5/120 | 4.4/120 |
| Acid number | | | | 96 | 96 | acid, of at least one other dicarboxylic acid, and (2) an amine component comprising (a) 0.9 to 0.3 equivalent parts of ethylene diamine and (b) 0.1 to 0.7 equivalent parts of an ether diamine of the formula $$H_2N-(CH_2)_n-O-(RO)_x-(CH_2)_n-NH_2$$

wherein $n$ is an integer from 2 to 5 inclusive and $x$ is 0 or an integer from 1 to 3 inclusive, and R is linear alkylene having from 1 to 12 carbon atoms or such linear alkylene additionally substituted with 1 to 4 alkyl groups each having 1 to 4 carbon atoms;

(B) from about 20 to about 60 percent, by weight of (A), of a tackifier selected from the group consisting of colophonium resins, toluene sulfonamides and N-substituted derivatives thereof, esters of aromatic acids, and chlorinated di- and poly-phenyls; and (C) from about 10 to 40 percent, by total weight of the adhesive, of a polyamide or polyester amide having an acid number between 70 and 100 and formed between (1) a polymeric fatty acid having a high dimeric fatty acid content and (2) an aliphatic hydroxylamine or aliphatic polyamine, wherein the number of mols of polymerized fatty acid employed equals the sum of the amino and hydroxy groups in component (2).

2. A hot melt pressure sensitive adhesive comprising: (A) a polyamide resin formed between substantially

TABLE II

| Example No. | Polyamide basic resin (gm.) | Tackifier (gm.) | Tack-retainer (gm.) | Ethylene/vinyl acetate (gm.) | Additives (gm.) | Prepared according to example number | Softening conditions | Remarks |
|---|---|---|---|---|---|---|---|---|
| 1 | 100 g. $A_1$ | 100 g. $B_1$ | | | | 1 | | Comparison example. |
| 2 | 40 g. $A_1$ | 30 g. $B_1$ | 30 g. $C_1$ | | | 1 | | Do. |
| 3 | 70 g. $A_1$ | 30 g. $B_2$ | | | | 1 | | Do. |
| 4 | 60 g. $A_1$ | 20 g. $B_2$ | 20 g. $C_1$ | | | 1 | | Do. |
| 5 | 50 g. $A_3$ | 50 g. $B_1$ | | | | 7 | 3 hours, 200° C. | Do. |
| 6 | | {166.2 g. $B_3$ / 136.1 g. $B_4$} | | 197.3 g. $D_1$ | | 7 | 2 hours, 180° C. | Do. |
| 7 | 50 g. $A_3$ | 40 g. $B_1$ | | 10 g. $D_1$ | | 7 | | |
| 8 | 50 g. $A_3$ | 30 g. $B_1$ | | 20 g. $D_1$ | | 7 | | |
| 9 | 40 g. $A_3$ | 40 g. $B_1$ | | 20 g. $D_1$ | | 7 | | |
| 10 | 50 g. $A_3$ | 30 g. $B_1$ | | 20 g. $D_2$ | | 7 | | |
| 11 | 20 g. $A_3$ | 30 g. $B_1$ | | 50 g. $D_1$ | | 7 | 190° C. | |
| 12 | 40 g. $A_3$ | 30 g. $B_1$ | 30 g. $C_1$ | | | 1 | 2 hours, 190° C. | |
| 13 | 40 g. $A_3$ | 25 g. $B_1$ | 25 g. $C_1$ | 10 g. $D_1$ | | 7 | do. | |
| 14 | 40 g. $A_3$ | 30 g. $B_1$ | 10 g. $C_1$ | 20 g. $D_1$ | | 7 | do. | |
| 15 | 50 g. $A_3$ | | 50 g. $C_2$ | | | 7 | do. | $C_2$ is also a tackifier. |
| 16 | 40 g. $A_3$ | 30 g. $B_1$ | 30 g. $C_1$ | | 100 g. chalk | 16 | | |
| 17 | 40 g. $A_3$ | 30 g. $B_1$ | 20 g. $C_1$ | | 10 g. $F_2$ | 17 | 2 hours, 190° C. | |
| 18 | 40 g. $A_2$ | 55 g. $B_1$ | | | 1 g. E and 4 g. $F_1$ | 18 | | |

TABLE III

| Example number | SP (° C.) | Viscosity (poises/° C.) | Surface tack | When adhesion lost | Ad (kgf./3 cm.) | HCR (cm.) | Comments |
|---|---|---|---|---|---|---|---|
| 1 | 60 | 30/120 | Good | After 1-2 days | 4.7 | | Comparision example. |
| 2 | 50 | 4/160 | do | Not after 7 days | 3.5 | | |
| 3 | 81 | 67/120 | do | After 1-2 days | 3.5 | | Do. |
| 4 | 57 | 30/160 | do | Not after 14 days | 3.8 | | Do. |
| 5 | 85 | 49/120 | do | | | 17 | Do. |
| 6 | 76 | 65/200 | do | | | 15 | Do. |
| 7 | 130 | 6/200 | do | | | 3 | |
| 8 | 149 | 14/200 | do | | | <1 | |
| 9 | 124 | 10/200 | do | | | 4 | |
| 10 | 138 | 15/200 | do | | | 0 | |
| 11 | 92 | 44/200 | do | | | 2.5 | |
| 12 | 91 | 16/120 | do | Not after 14 days | | | |
| 13 | 115 | 6/200 | do | Not after 7 days | | | |
| 14 | 93 | 44/200 | do | do | | | |
| 15 | 141 | 3/200 | do | Not after 14 days | | | |
| 16 | 110 | | do | do | | | |
| 17 | 110 | 40/120 | do | Not after 7 days | 3.5 | | |
| 18 | 53 | 16/120 | do | | | | |

What is claimed is:

1. A hot melt pressure sensitive adhesive comprising: (A) a polyamide resin formed between substantially equivalent quantities of (1) an acid component comprising (a) a polymeric fatty acid having a high dimeric fatty acid content in admixture with (b) up to 20 percent, by weight of said polymeric fatty acid, of at least one other dicarboxylic acid, and (2) an amine component comprising (a) 0.9 to 0.3 equivalent parts of ethylene diamine and (b) 0.1 to 0.7 equivalent parts of an ether diamine of the formula

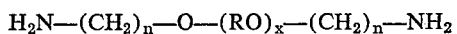
$H_2N-(CH_2)_n-O-(RO)_x-(CH_2)_n-NH_2$ wherein $n$ is an integer from 2 to 5 inclusive and $x$ is 0 or an integer from 1 to 3 inclusive, and R is linear alkylene having from 1 to 12 carbon atoms or such linear alkylene additionally substituted with 1 to 4 alkyl groups each having 1 to 4 carbon atoms;
(B) from about 20 to about 60 percent, by weight of (A), of a tackifier selected from the group consisting of colophonium resins, toluene, sulfonamides and N-substituted derivatives thereof, esters of aromatic acids, and chlorinated di- and poly-phenyls.
(C) from about 10 to about 30 percent, by total weight of the adhesive, of a polyamide or polyester amide having an acid number between 70 and 100 and formed between (1) a polymeric fatty acid having a high dimeric fatty acid content and (2) an aliphatic hydroxylamine or aliphatic polyamine, wherein the number of mols of polymerized fatty acid employed equals the sum of the amino and hydroxy groups in component (2); and
(D) from about 5 to about 50 percent, by weight of (A), of a copolymer of ethylene and vinyl acetate comprising from 60 to 90 parts by weight of ethylene and from 40 to 10 parts of vinyl acetate.

References Cited
UNITED STATES PATENTS

| | | | |
|---|---|---|---|
| 3,499,853 | 3/1970 | Griebsch et al. | 260—78 R |
| 2,839,219 | 6/1958 | Groves et al. | 260—18 N |
| 3,644,245 | 2/1972 | Flanagan et al. | 260—24 |
| 3,646,154 | 2/1972 | Marans et al. | 260—18 N |

HOSEA E. TAYLOR, Primary Examiner

G.R. MARSHALL, Assistant Examiner

U.S. Cl. X.R.

260—24

UNITED STATES PATENT OFFICE
CERTIFICATE OF CORRECTION

Patent No. 3,792,002     Dated February 12, 1974

Inventor(s) Krieger et al.

It is certified that error appears in the above-identified patent and that said Letters Patent are hereby corrected as shown below:

<u>In the heading</u>, after "Berlin" insert --and Bergkamen--.

<u>Column 2, line 12</u>, replace "or" by --of--.

Signed and sealed this 10th day of September 1974.

(SEAL)
Attest:

McCOY M. GIBSON, JR.
Attesting Officer

C. MARSHALL DANN
Commissioner of Patents